United States Patent
Koetzinger

(10) Patent No.: US 9,975,389 B2
(45) Date of Patent: May 22, 2018

(54) WHEEL CARRIER OF A VEHICLE HAVING A CLAMPING-FIT CONNECTION

(71) Applicant: Bayerische Motoren Werke Aktiengesellschaft, Munich (DE)

(72) Inventor: Georg Koetzinger, Inzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days. days.

(21) Appl. No.: 15/365,072

(22) Filed: Nov. 30, 2016

(65) Prior Publication Data

US 2017/0080766 A1    Mar. 23, 2017

Related U.S. Application Data

(63) Continuation of application No. PCT/EP2015/059647, filed on May 4, 2015.

(30) Foreign Application Priority Data

Jun. 17, 2014   (DE) ........................ 10 2014 211 632

(51) Int. Cl.
*B60G 13/00* (2006.01)
*B60G 15/06* (2006.01)
(Continued)

(52) U.S. Cl.
CPC ........ *B60G 13/005* (2013.01); *B60B 27/0047* (2013.01); *B60G 15/068* (2013.01);
(Continued)

(58) Field of Classification Search
CPC ................ B60G 13/005; B60G 15/068; B60G 2204/43; B60G 2206/50;
(Continued)

(56) References Cited

U.S. PATENT DOCUMENTS 4,577,534 A * 3/1986 Rayne ................. B25B 27/0035
280/86.755
4,753,462 A * 6/1988 Liu ....................... F16B 7/1418
285/420

(Continued)

FOREIGN PATENT DOCUMENTS

DE         195 42 496 C1    10/1996
DE   10 2007 021 228 A1   11/2008
(Continued)

OTHER PUBLICATIONS

International Search Report (PCT/ISA/210) issued in PCT Application No. PCT/EP2015/059647 dated Aug. 26, 2015 with English translation (seven pages).

(Continued)

*Primary Examiner* — Drew J Brown
(74) *Attorney, Agent, or Firm* — Crowell & Moring LLP

(57) ABSTRACT

A wheel carrier of a vehicle has a clamping-fit connection to a further component, preferably a suspension strut, including a threaded connection having a screw for clamping the clamping-fit connection; a hole, in which the screw sits; and a lever, which has a fastening segment and an impact segment. The fastening segment is fastened by the threaded connection. The impact segment protrudes from the fastening segment in such a way that, in the event of a vehicle crash and the accompanying deformation, a part of the vehicle applies a force to the impact segment in order to at least partially loosen the threaded connection. At least one material taper or material recess is formed in the material of the wheel carrier surrounding the hole in order to enable an at least partial break-out of the screw from the hole in the event of the application of force to the lever.

16 Claims, 3 Drawing Sheets

(51) Int. Cl.
*B62D 7/18* (2006.01)
*B60B 27/00* (2006.01)

(52) U.S. Cl.
CPC .......... *B62D 7/18* (2013.01); *B60G 2204/129* (2013.01); *B60G 2204/43* (2013.01); *B60G 2204/4304* (2013.01); *B60G 2206/016* (2013.01); *B60G 2206/50* (2013.01)

(58) Field of Classification Search
CPC ...... B60G 2204/4304; B60G 2204/129; B60G 2206/016; B60B 27/0047; B62D 7/18
See application file for complete search history.

(56) References Cited

U.S. PATENT DOCUMENTS

| | | | | |
|---|---|---|---|---|
| 5,170,973 | A * | 12/1992 | Ohta | B60G 13/006 248/230.2 |
| 6,244,604 | B1 * | 6/2001 | McIntyre | B60G 15/07 280/86.753 |
| 9,656,528 | B2 * | 5/2017 | Perri | B60G 11/08 |
| 2013/0181421 | A1 * | 7/2013 | Rohde | B60G 13/006 280/93.512 |
| 2013/0241166 | A1 * | 9/2013 | Paintmayer | B60G 7/02 280/124.125 |
| 2014/0291084 | A1 * | 10/2014 | Hertz | F16F 9/54 188/266 |
| 2015/0307133 | A1 * | 10/2015 | Mentzel | B60G 13/005 280/784 |
| 2016/0009153 | A1 * | 1/2016 | von Hasselbach | B60G 13/005 280/124.125 |
| 2017/0021686 | A1 * | 1/2017 | Perri | B60G 7/008 |
| 2017/0297397 | A1 * | 10/2017 | Ubaldo | B60G 7/02 |

FOREIGN PATENT DOCUMENTS

| | | |
|---|---|---|
| DE | 10 2012 205 035 B3 | 6/2013 |
| DE | 10 2012 007 889 B3 | 10/2013 |
| DE | 10 2012 218 224 B3 | 3/2014 |
| DE | 10 2012 021 269 A1 | 4/2014 |

OTHER PUBLICATIONS

German-language Written Opinion (PCT/ISA/237) issued in PCT Application No. PCT/EP2015/059647 dated Aug. 26, 2015 (six pages).

* cited by examiner

WHEEL CARRIER OF A VEHICLE HAVING A CLAMPING-FIT CONNECTION

CROSS REFERENCE TO RELATED APPLICATIONS

This application is a continuation of PCT International Application No. PCT/EP2015/059647, filed May 4, 2015, which claims priority under 35 U.S.C. § 119 from German Patent Application No. 10 2014 211 632.5, filed Jun. 17, 2014, the entire disclosures of which are herein expressly incorporated by reference.

BACKGROUND AND SUMMARY OF THE INVENTION

The present invention relates to a wheel carrier of a vehicle having a clamping-fit connection to a further component. The further component is particularly a suspension strut for connecting the wheel carrier with the vehicle body.

It is basically endeavored to design a vehicle, for example, a passenger car, to be as safe as possible also in the event of an accident, i.e. when the vehicle hits an obstacle (=crash). In order to minimize the risk of injury to the vehicle occupants in the event of such an impact, it should be ensured that the vehicle parts situated in front of the vehicle interior, viewed in the driving direction, such as the vehicle front structure, if possible, will not penetrate into the vehicle interior. With respect to the front wheels of the vehicle, a design of the wheel suspension control arms is known, for example, such that, in the case of a so-called offset impact, the wheel is swiveled laterally to the outside. For this purpose, according to German Patent Document DE 195 42 496 C1, a rear control arm strut can be longitudinally deformed, i.e. shortened, in an energy-absorbing manner.

It is an object of the present invention to provide a wheel carrier for a vehicle which, while its production and assembly are cost-effective, permits a safe operation of the vehicle, particularly also in the event of a crash. In particular, an advantageous measure is provided by which a front wheel of the vehicle can be quasi partially loosened in the event of a frontal crash or a rear wheel of a vehicle can be quasi partially loosened in the event of a rear crash, so that the wheel can move in a desired manner and will not endanger the occupants.

This and other objects are achieved according to the invention by a wheel carrier of a vehicle, particularly a motor vehicle. The wheel carrier has a clamping-fit connection. By way of this clamping-fit connection, the wheel carrier can be connected with an additional component. In particular, this additional component is a suspension strut or the like. The wheel carrier comprises a screwed connection with a screw for clamping the clamping-fit connection. A hole, in which the screw is disposed, is provided for this purpose. The screw is either screwed into a thread in the hole, or a nut or the like is provided at the end of the screw. By way of the clamping-fit connection, the additional component, particularly the suspension strut, can be clamped in by tightening the screwed connection.

Furthermore, a lever is provided. The lever has a fastening section and an impact section. The lever is fastened to a clamping-fit connection by way of the fastening section. A through-hole is, for example, provided in the fastening section. The screw of the screwed connection projects through this screw hole. The fastening section of the lever is thereby clamped in under the screw head or the nut of the screwed connection. The impact section projects from the fastening section. A deformation of the vehicle occurs in the event of a crash. The impact section is arranged such that a component of the deforming vehicle will impact on the impact section and thereby applies a force to the impact section. As a result of the effect of this force upon the impact section, the lever causes a force upon the screw. As a result, the screw is at least partially loosened, whereby the clamping-fit is also loosened. As a result of the loosened clamping-fit connection, the wheel carrier can move with respect to the additional component, particularly the suspension strut. It then becomes possible that the wheel situated on the wheel carrier carries out a desirable motion during the crash.

At least one taper or recess of material is provided in the wheel carrier material surrounding the hole. When force acts upon the lever, this taper or recess of material permits an easy breaking-out of the screw from the hole. Without this taper or recess of material, the force required for the at least partial loosening of the screw would be relatively high and would not be reliably repeatable. Furthermore, the lever would have to be very massive. As a result of the use of material taper or recess according to the invention, the lever should not destroy the screw during the crash, but the material surrounding the hole will break open. The screw can thereby at least partially be laterally levered out of the hole. As a result, the lever does not have to have an overly massive design and the loosening of the clamping-fit connection during the crash can be made to be repeatable and reliable with respect to the process. Furthermore, by use of the levering-out of the screw, the clamping of the clamping-fit connection is actively canceled.

Advantageously, the taper or recess of material is shaped to be sufficiently large in order to ensure a reliable breaking-open of the hole and thus a levering-out of the screw. For this purpose, it is preferably provided that the taper and recess of the material extends over at least 10%, preferably at least 20%, of the length of the hole.

The material recess is advantageously formed as a complete breakthrough in the material surrounding the hole. As a result of the formation of the breakthrough, the surface of the screw in the hole is exposed at least in places. Such a recess of material as a complete breakthrough is easy to produce and permits a reliable and repeatable breaking-out of the screw.

The clamping-fit connection is advantageously designed as a clamp. This clamp is an integral component of the wheel carrier. The clamp normally has a slot. This slot divides the hole, in which the screw is situated, into a first hole section and a second hole section. During the tightening of the screwed connection, the width of the slot will be reduced, which causes clamping of the clamping-fit connection. The lever structure is advantageously fastened to an outer end of the first hole section.

The corresponding fastening of the lever to the first hole section advantageously forms the taper or recess of material provided according to the invention at the material surrounding the first hole section.

Particularly preferably, the recess of material is a longitudinal slot at the first hole section. This longitudinal slot is shaped as a complete breakthrough, so that the surface of the screw will be exposed at the longitudinal slot.

Particularly preferably, the longitudinal slot extends over at least 80%, advantageously over at least 90%, of the length of the first hole section. Particularly preferably, the longitudinal slot is formed over 100%, therefore over the entire first hole section. The use of this longitudinal slot permits a correspondingly simple levering of the screw out of the first hole section. In this case, no recess or taper of material is provided particularly in the area of the second hole section, so that, during the levering-out of the screw, the screws remains firmly in the second hole section. This causes not only a loosening of the screw from the first hole section but simultaneously also a levering-open of the entire clamp.

The invention advantageously includes a vehicle, particularly a motor vehicle, having a vehicle body and at least one above-described wheel carrier. The component, which is fastened in the clamping-fit connection, connects the wheel carrier with the vehicle body. Correspondingly, the component is advantageously constructed as a suspension strut or the like.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
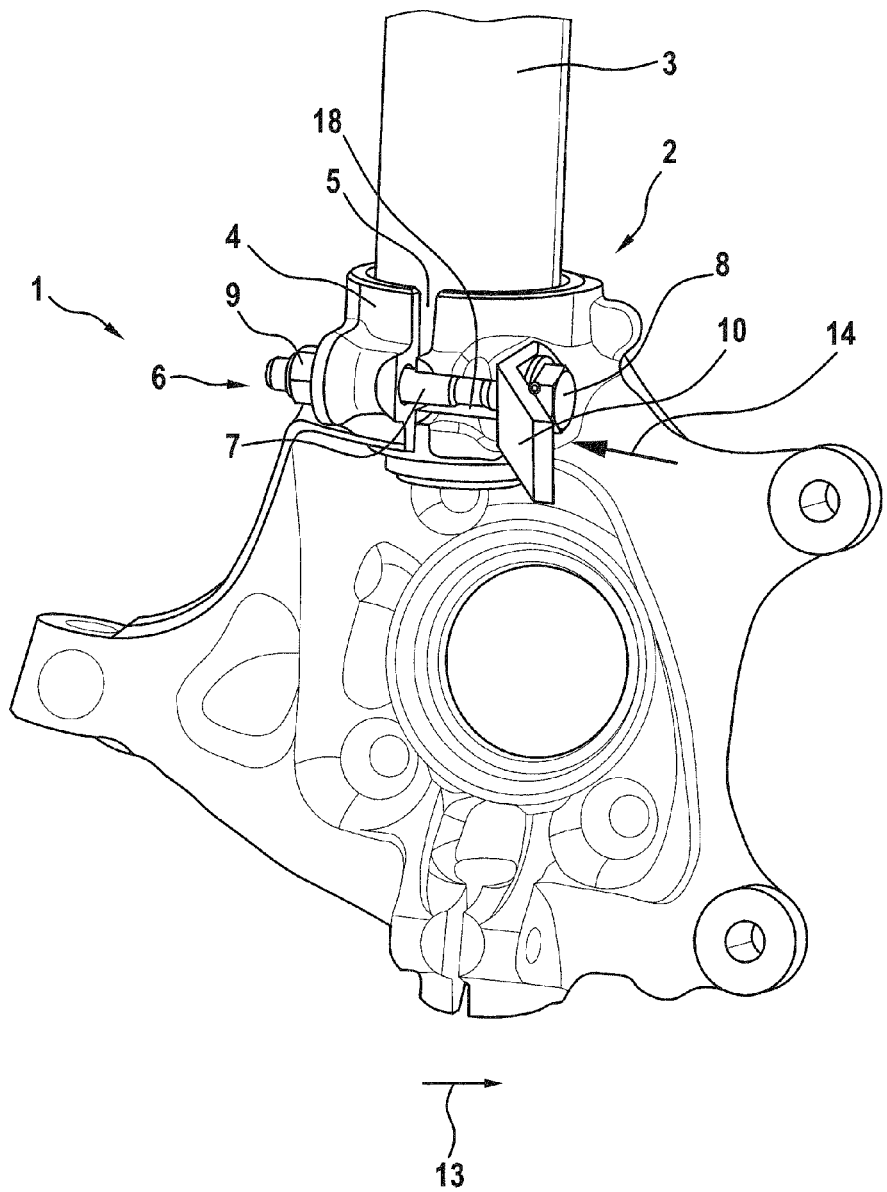
FIG. 1 is a view of a wheel carrier according to an embodiment of the invention.
Figure 2:
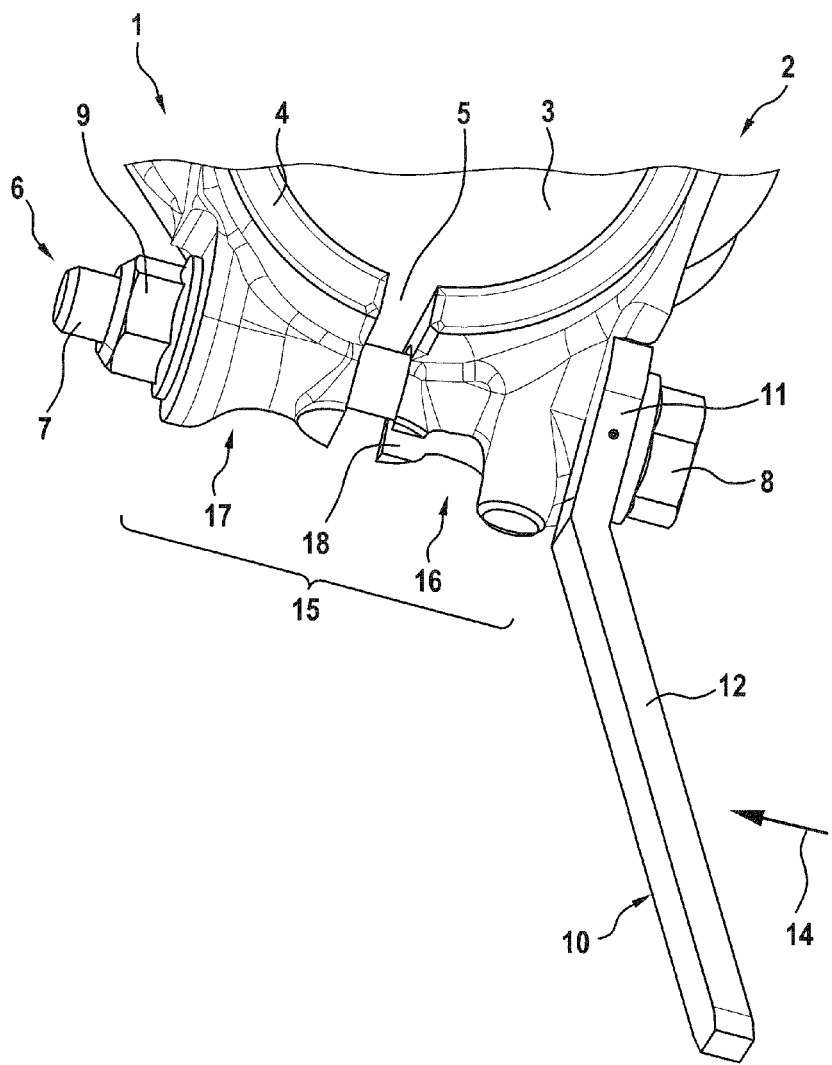
FIG. 2 is a view of a first detail of FIG. 1.
Figure 3:
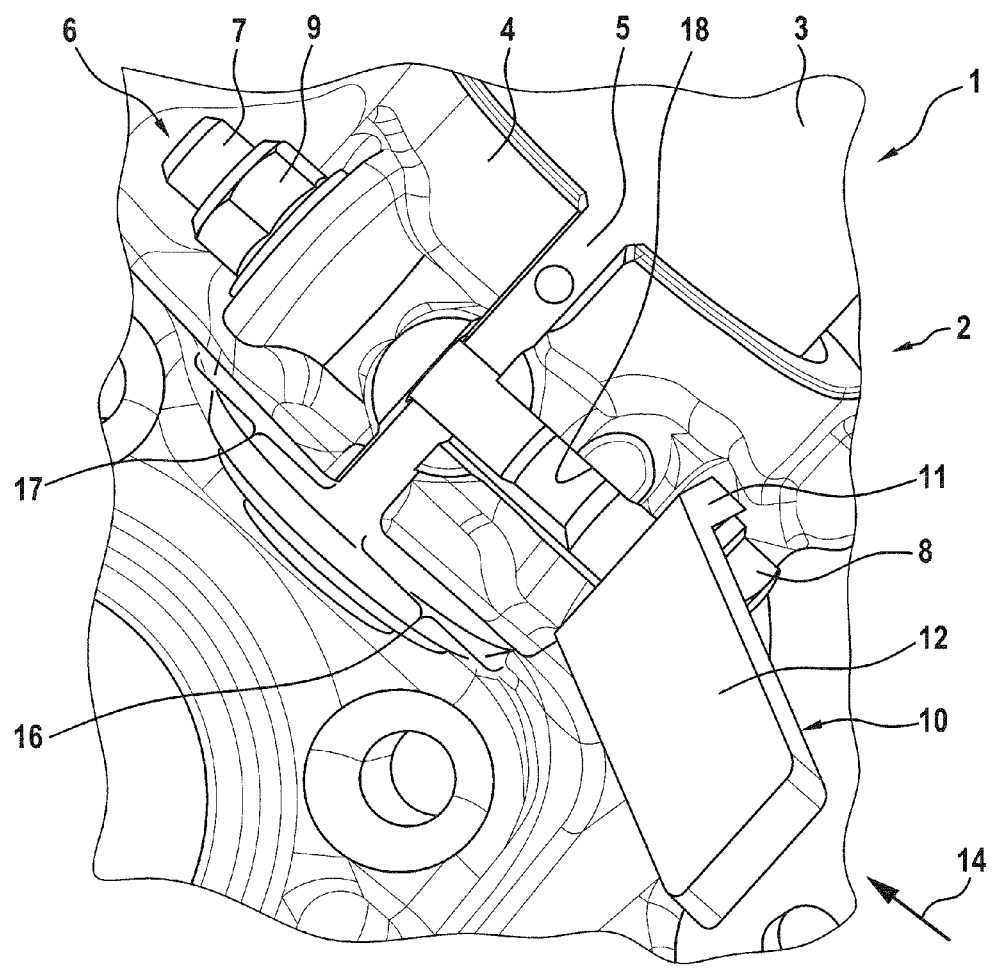
FIG. 3 is a view of a second detail of FIG. 1.

In the following, a wheel carrier 1 according to an embodiment of the invention will be described using FIGS. 1-3. FIGS. 2 and 3 each show details of FIG. 1.

The wheel carrier 1 is used for rotatably carrying a wheel of a motor vehicle. A front left wheel carrier 1 is illustrated in the embodiment of FIG. 1. Accordingly, a traveling direction 13 of the vehicle is also outlined. The wheel carrier 1 has a clamping-fit connection 2. A further component 3—here constructed as a suspension strut—is clamped into this clamping-fit connection 2. By way of this further component 3, the wheel carrier 1 is connected with a vehicle body that is not shown.

The clamping-fit connection 2 is constructed as a clamp 4. The clamp 4 is an integral component of the wheel carrier 1. The clamp 4 has a slot 5. The width of the slot 5 is reduced by tightening the screwed connection 6, and the further component 3 can thereby be clamped into the clamping-fit connection 2.

The screwed connection 6 includes a screw (bolt) 7 having a head 8 as well as a nut 9 screwed onto the screw 7.

A lever 10 is provided, as illustrated particularly by the representation of the detail in FIG. 2. As a one-piece component, the lever 10 is divided into a fastening section 11 and an impact section 12. The fastening section 11 of the lever 10 is clamped in under the head 8 of the screw 7. The impact section 12 projects from the fastening section 11. A crash of the vehicle causes a deformation of the vehicle and thereby an impacting of certain parts of the vehicle on the impact section 12. This results in the schematically outlined force effect 14. As a result of the force effect 14, a corresponding force acts by way of the lever 10 upon the screwed connection 6 and upon the clamping-fit connection 2.

In particular, FIGS. 2 and 3 show the shape of a hole 15 in the clamping-fit connection 2. A screw 7 is situated in this hole 15. The slot 5 of the clamp 4 divides the hole 15 into a first hole section 16 and into a second hole section 17. The fastening section 11 of the lever 10 is clamped in under the head 8 of the screw 7 at the first hole section 16. A recess 18 of material is provided in the material surrounding the first hole section 16. In the illustrated embodiment, this material recess is constructed as a longitudinal slot. Particularly, FIG. 3 illustrates that the material recess 18 exposes the screw 7 along the entire length of the first hole section 16.

By means of the force effect 14 upon the lever 16, the screw 7 can be levered out by way of the material recess 18. The clamping-fit connection 2 is thereby loosened. Because of the loosening of the clamping-fit connection 2, the wheel carrier 1 can move with respect to the component 3. As a result, it becomes possible that, in the event of a crash, the wheel fastened to the wheel carrier 1 is correspondingly moved and can be moved into the position preferred for the crash.

The embodiment illustrates the material recess 18 constructed as a longitudinal slot. As an alternative or addition, it is contemplated that the material recess 18 represents only a material taper at the first hole section 16 and/or at the second hole section 17. The corresponding material taper can be broken open by the force effect, so that then also a levering-out of the screw 7 will take place.

LIST OF REFERENCE NUMBERS

1 Wheel carrier
2 Clamping-fit connection
3 Further component, particularly suspension strut or the like
4 Clamp
5 Slot
6 Screwed connection
7 Screw (bolt)
8 Head
9 Nut
10 Lever
11 Fastening section
12 Impact section
13 Traveling direction
14 Force effect
15 Hole
16 First hole section
17 Second hole section
18 Material recess, particularly longitudinal slot The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A wheel carrier of a vehicle having a clamping-fit connection to a further component, comprising:
a screwed connection having a screw for the clamping of the clamping-fit connection;
a hole, in which the screw is situated; and
a lever having a fastening section and an impact section, wherein
the fastening section is fastened by way of the screwed connection, and the impact section projects from the fastening section such that, in an event of a vehicle crash and a resulting deformation, a part of the vehicle causes a force upon the impact section in order to at least partially loosen the screwed connection, and
at least one taper or recess of material is formed in the material of the wheel carrier surrounding the hole, in order to permit an at least partial breaking-out of the screw from the hole in the event of the force effect upon the lever.

2. The wheel carrier according to claim 1, wherein the material taper or material recess extends over at least 10% of the length of the hole.

3. The wheel carrier according to claim 1, wherein the material taper or material recess extends over at least 20% of the length of the hole.

4. The wheel carrier according to claim 1, wherein the at least one material recess is constructed such that a surface of the screw is exposed at least in places in the hole.

5. The wheel carrier according to claim 1, wherein the clamping-fit connection is constructed as a clamp in the wheel carrier, a slot of the clamp dividing the hole into a first hole section and a second hole section, and the lever being fastened to the first hole section.

6. The wheel carrier according to claim 5, wherein the material taper or material recess is formed only at the first hole section.

7. The wheel carrier according to claim 6, wherein the material recess is formed as a longitudinal slot at the first hole section, so that the surface of the screw is exposed in the first hole section.

8. The wheel carrier according to claim 5, wherein the material recess is formed as a longitudinal slot at the first hole section, so that the surface of the screw is exposed in the first hole section.

9. The wheel carrier according to claim 7, wherein the longitudinal slot extends at least over 80% of the length of the first hole section.

10. The wheel carrier according to claim 7, wherein the longitudinal slot extends at least over 90% of the length of the first hole section.

11. The wheel carrier according to claim 7, wherein the longitudinal slot extends at least over 100% of the length of the first hole section.

12. The wheel carrier according to claim 8, wherein the longitudinal slot extends at least over 80% of the length of the first hole section.

13. The wheel carrier according to claim 8, wherein the longitudinal slot extends at least over 100% of the length of the first hole section.

14. The wheel carrier according to claim 1, wherein the further component is a suspension strut.

15. A vehicle, comprising:
a vehicle body and at least one wheel carrier according to claim 1, wherein
the component fastened in the clamping-fit connection connects the wheel carrier with the vehicle body.

16. The vehicle according to claim 15, wherein the vehicle is a passenger vehicle and the further component is a suspension strut.

* * * * *